United States Patent
Chatterjee et al.

(10) Patent No.: US 8,886,688 B2
(45) Date of Patent: Nov. 11, 2014

(54) TYPE NEUTRAL CONTAINER

(75) Inventors: Ramkrishna Chatterjee, Nashua, NH (US); Marco Carrer, Reading, MA (US); Amit Dhuleshia, North Andover, MA (US); Ramesh Vasudevan, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1279 days.

(21) Appl. No.: 12/317,729

(22) Filed: Dec. 29, 2008

(65) Prior Publication Data

US 2010/0169306 A1 Jul. 1, 2010

(51) Int. Cl.
*G06F 17/30* (2006.01)

(52) U.S. Cl.
CPC ................................ *G06F 17/30412* (2013.01)
USPC .......................................... 707/807; 707/756

(58) Field of Classification Search
USPC ............................ 707/807, 791, 756; 719/316
See application file for complete search history.

(56) References Cited

U.S. PATENT DOCUMENTS 7,386,797 B1 6/2008 Chatterjee et al.
8,060,518 B2 * 11/2011 Timmons ...................... 707/755
2007/0088725 A1 * 4/2007 Demiroski et al. ............ 707/707
2007/0124373 A1 5/2007 Chatterjee et al.
2007/0214216 A1 9/2007 Carrer et al.
2010/0064296 A1 * 3/2010 Bertram et al. ................ 719/315
2010/0115531 A1 * 5/2010 Cook et al. ..................... 719/316

OTHER PUBLICATIONS

Tien Nguen ("Model-Based Version and Configuration Management for a Web engineering Lifecycle," IW3C2, May 2006, pp. 437-447).*
Tien Nguyen, "Model Based Version and Configuration Management for a Web Engineering Lifecycle," IW3C2, May 2006, pp. 437-447.*
Tien Nguen, "Model Based Version and Configuration Management for a Web Engineering Lifecycle," IW3C2, May 2006, pp. 437-447.*

* cited by examiner

*Primary Examiner* — Robert Beausoliel, Jr.
*Assistant Examiner* — Alexandria Bromell
(74) *Attorney, Agent, or Firm* — Kraguljac Law Group, LLC

(57) ABSTRACT

Systems, methods, and other embodiments associated with an artifact type neutral container are described. This artifact type neutral container is achieved through an artifact type neutral architecture that is managed using a central type neutral registration mechanism. Queries are executed on type neutral registration tables to return data stores that store the artifacts found within a given artifact type neutral container. The data stores are queried to return the artifacts in the artifact type neutral container. The artifact type neutral container can be used in systems in which the artifact type neutral container and artifact data are stored in the same database as well as in systems in which the artifact type neutral container and artifact data are stored in different databases.

17 Claims, 6 Drawing Sheets

TYPE NEUTRAL CONTAINER

BACKGROUND

In a collaborative software environment, containers are mechanisms by which artifacts are aggregated according to some user criteria. For example, a container can be created by a user to aggregate artifacts associated with a given project. Some examples of containers are a folder of email messages and a task list that includes several tasks. In modern collaborative software environments, users frequently work with related artifacts of many different types.

Presently, many collaborative software systems do not provide containers that can contain artifacts of more than one type. Some collaborative software systems provide containers that can contain several types of artifacts. However, these systems are implemented in artifact specific schemes that impose restrictions on lifecycle operations of the artifacts, require duplication of data for container purposes, and/or add significant performance overhead to the collaborative software system.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1A:
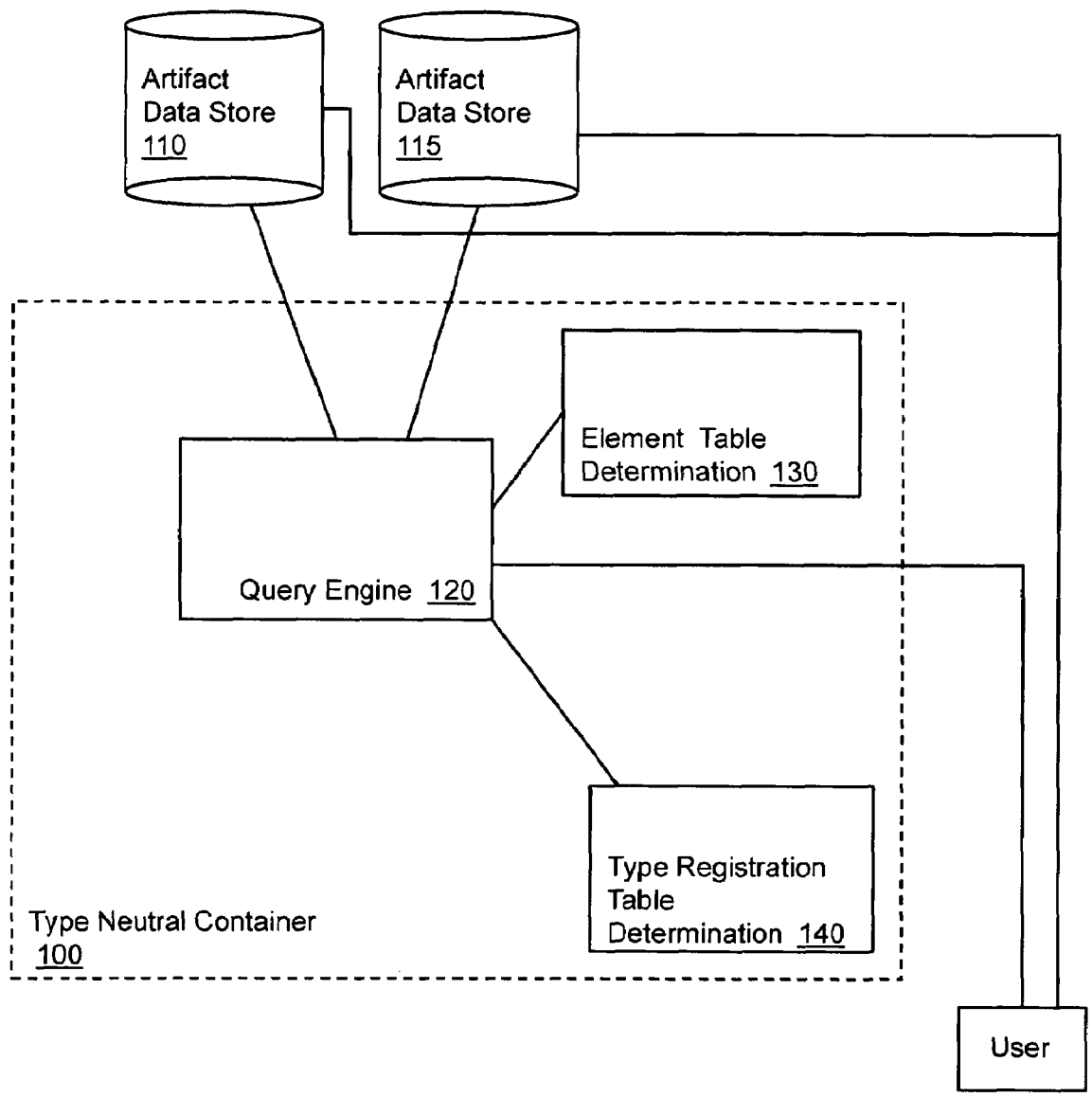
FIG. 1A illustrates an example embodiment of a system associated with an artifact type neutral container.

A flexible, lightweight, hierarchical artifact type neutral container is provided. The artifact type neutral container provides the benefits of heterogeneous content aggregation with minimal impact on the artifact lifecycle operations. For example, artifact creation, update, deletion, and retrieval operations can be performed in the normal manner with minimal interference by the artifact type neutral container. The artifact type neutral container does not require data duplication or data collocation for implementation. No physical constraints are placed on artifact data structure. This artifact type neutral container is achieved through an artifact type neutral architecture that is managed using a central type neutral registration mechanism. The artifact type neutral container can be used in systems in which the artifact type neutral container and artifact data are stored in the same database as well as in systems in which the artifact type neutral container and artifact data are stored in different databases.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an OQL, a natural language, and so on.

"Software", as used herein, includes but is not limited to, one or more executable instruction that cause a computer, processor, or other electronic device to perform functions, actions and/or behave in a desired manner.

"Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1A illustrates an artifact type neutral container 100 as functional blocks. The artifact type neutral container 100 is able to access one or more artifact data stores 110, 115 in which data for artifacts contained in the artifact type neutral container is stored. The artifact data stores 110, 115 may be SQL data source tables or views that expose an artifact identifier, an artifact type neutral container identifier and an artifact type identifier for each artifact. The data columns may be exposed through a view over the artifact data store if any of the exposed columns is the result of a computation. It can be seen that multiple artifact types may be stored in the same data store or physical table. In addition, artifact update, deletion, and retrieval operations can be performed in the normal manner by accessing the data stores 110, 115 without additional constraints required by the artifact type neutral container. Creation of artifacts involves an additional registration operation that can be performed in a uniform manner regardless of artifact type.

Figure 4:
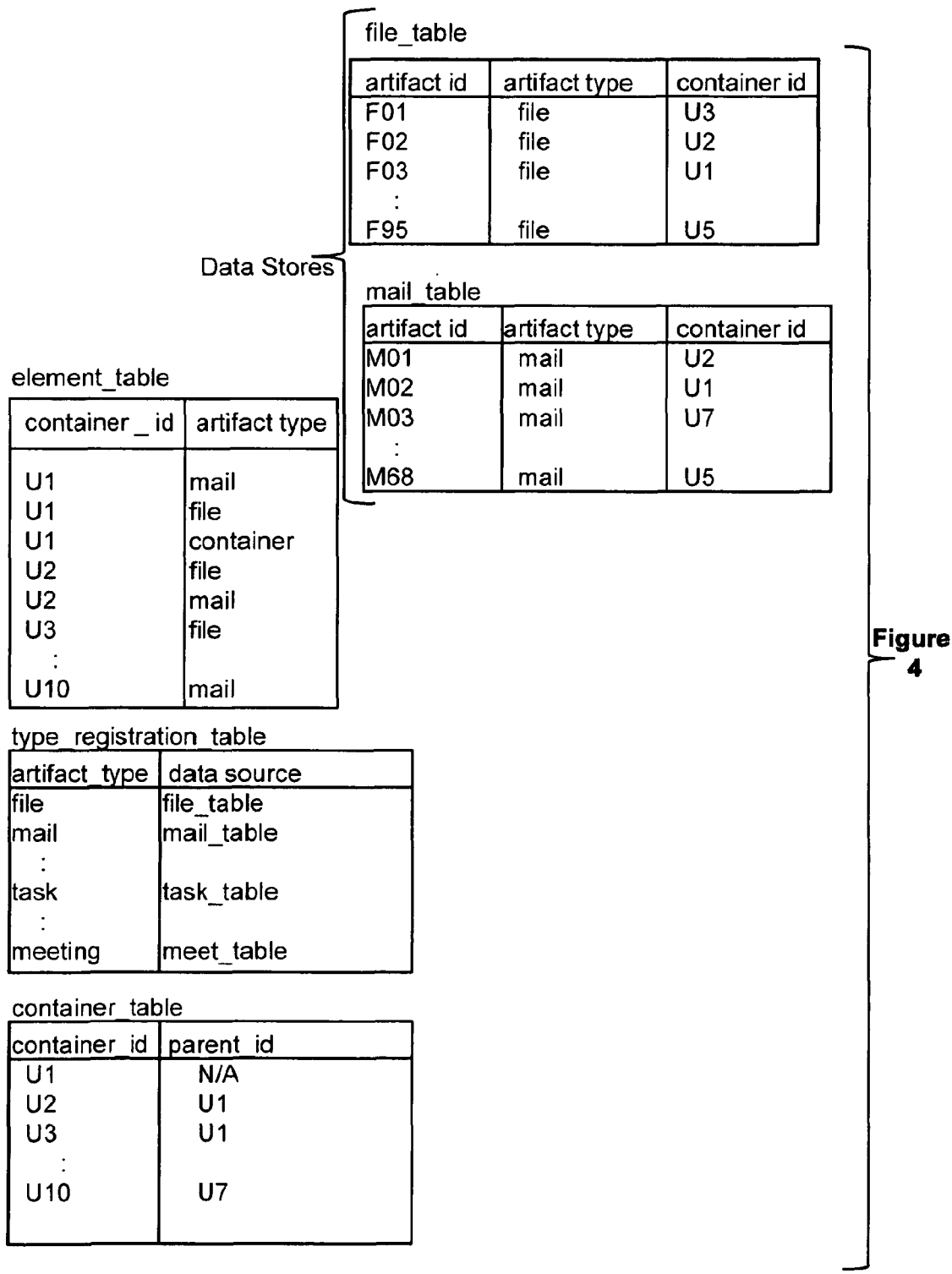
FIG. 4 illustrates an example embodiment of a collection of data tables used in a system associated with an artifact type neutral container.

The artifact type neutral container 100 includes an element table determination logic that maintains an element table (one example element table is shown in FIG. 4). The element table maintained by the element table determination logic 130 maps a container identifier to an element type identifier for each type of artifact aggregated within the artifact type neutral container. The artifact type neutral container 100 also includes a type registration table determination logic that maintains a type registration table (one example type registration table is shown in FIG. 4). The type registration table maintained by the type registration table determination logic maps each artifact type identifier to a data store that stores artifacts of the type identified by the artifact type identifier. These two tables provide a type neutral registration architecture that allows the artifact type neutral container to contain artifacts of any type without imposing constraints on the artifacts themselves.

The artifact type neutral container 100 includes a query engine 120 that generates and executes dynamic PL/SQL (Procedural Language/Structured Query Language) queries on the element table, type registration table, and data stores 110, 115. For example, to provide a list of elements in a given artifact type neutral container, the query engine 120 generates and executes a query on the element table maintained by the element table determination logic to return the element type identifiers of artifacts aggregated within the artifact type neutral container. The query engine 120 also generates and executes a query on the type registration table maintained by the type registration table determination logic to return one or more data store identifiers that identify one or more data stores (e.g., data stores 110, 115) that store artifacts of the returned element types. The query engine 120 then generates and executes a query on the one or more data stores identified by the one or more data store identifiers to return artifacts aggregated within the artifact type neutral container.

In one example embodiment, there is a primary key constraint defined on the artifact type neutral container identifier and element type identifier columns of the element table to prevent race conditions as described below.

In one example embodiment, there is a referential integrity constraint between the container identifier and the artifact type identifier columns of the data store and the container identifier and element type identifiers of the element table. For the purposes of this constraint, the data store is treated as the child table and the element table is treated as the parent table. This is to avoid "orphaning" a record in the data store that includes the container identifier and artifact type combination that is being deleted from element table.

The referential integrity constraint can be used to prevent a race condition from occurring when an attempt is made to delete an element type from an artifact type neutral container. If a record exists in the data store for the artifact type corresponding to the element type and the artifact type neutral container, then the deletion of the element type in the element table will be prevented. In some rare cases, a deadlock may occur due to the referential integrity constraint between the container identifier and the artifact type identifier columns of the data store and the container identifier and element type identifiers of the element table. For example, a situation may arise in which an artifact type neutral container U contains two artifacts A1 and A2 of the same type and two users simultaneously issue deletion requests for artifacts A1 and A2. The situation becomes further complicated if A1 and A2 are first deleted from the data store and then an attempt is made to delete the row for the artifact type and the container U in the element table in the first user's session. This will cause an attempt to acquire an index lock on the data store table and the first session will block because A2 has been deleted in another session. On the other hand, the second session will block when it tries to delete the same row from the element table, resulting in deadlock.

One way to deal with this deadlock is to simply not allow deletion of an element type from the element table. This approach would cause a redundant query on the data store for an element type that should have been deleted and has no artifacts left in the data store. However, in practice this should not be an issue because it is expected that only in rare circumstances would all of the artifacts of a given type be deleted from an artifact type neutral container. Further, even if all of the artifacts of a given type were deleted from an artifact type neutral container, it is highly likely that artifacts of that type would again be created in the artifact type neutral container.

Another way to deal with the deadlock is to acquire a select-for-update lock on the element able row before deleting artifact from the data store. In this case, artifact deletion from the data store would involve acquiring a select-for-update lock on the element table, deletion of the artifact from the data store, and deletion of the artifact type from the element table. The select-for-update lock acts as a synchronization point between the two sessions and prevents the race condition. The main drawback of this approach is that it incurs extra cost due to the select-for-update lock. Thus, in most cases, not allowing deletion of element types from the element table may be the preferred approach.

Figure 1B:
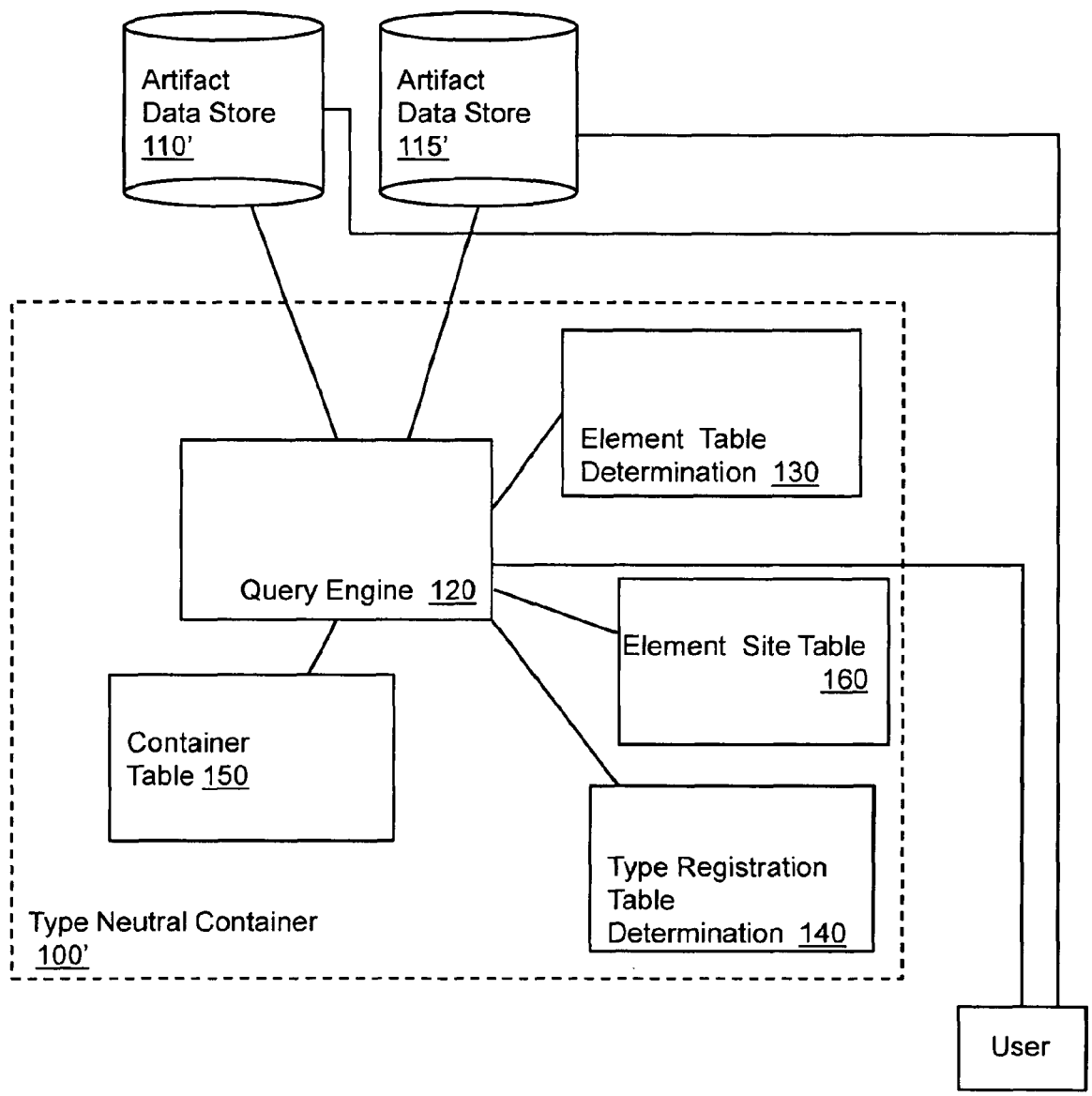
FIG. 1B illustrates another example embodiment of a system associated with an artifact type neutral container.

FIG. 1B illustrates one example embodiment of an artifact type neutral container 100' that enables creation of a hierarchical arrangement of artifact type neutral containers that may contain other artifact type neutral containers. The artifact type neutral container 100' includes the query engine 120, the element table determination logic 130 and type registration table determination logic as described in connection with the artifact type neutral container 100 of FIG. 1A. To support a hierarchical arrangement of artifact type neutral containers, the artifact type neutral container 100' includes a container table 150 (an example container table is shown in FIG. 4). The container table 150 maps a child container identifier that identifies a child artifact type neutral container to one or more parent container identifiers that identify one or more parent artifact type neutral containers in which the child artifact type neutral container is aggregated. If the query on the element table for a given artifact type neutral container returns an artifact type of container, then the given container contains other containers. In this case the query engine 120 queries the container table to return a child container identifier that is mapped to the artifact type neutral container such that the artifact type neutral container is a parent container to the child container. In this manner, any child containers contained by a given parent container may be accessed along with other non-container artifacts contained in the parent container.

In one example embodiment, there is a referential integrity constraint between the container identifier in the data store and the container identifier in the container table. For the purposes of the constraint, the data store is treated as the child table and the container table is treated as the parent table. This constraint avoids race between container deletion and element creation.

FIG. 1B also illustrates a multi-database implementation of the artifact type neutral container 100'. The artifact data stores 110', 115' are located in a database that is separate from the data base on which the artifact type neutral container 100' is located. In this case, the artifact type neutral container 100' includes an element site table 160 in the database in which the artifact type neutral container is located that keeps track of databases that store data for artifacts contained in the artifact type neutral container 100'. The artifact type neutral container table is also located in the database in which the artifact data is located. The element site table 160 records an artifact type neutral container identifier and a database identifier that identifies the database that contains data for the artifact type neutral container identified by the container identifier. In one example embodiment, a primary key constraint is defined on the container identifier and the database identifier in the element site table.

In the multi-database example, the type registration table and element table only store information that is relevant to artifacts stored in the database in which they reside. As such, these tables reside on the databases in which artifacts that they reference reside. For example, if no artifact in a given database belongs to an artifact type neutral container, then there is no entry for any non-container artifact type for this artifact type neutral container in the element table in the database. When a first artifact in a given database is created, the data for the artifact type neutral container and its ancestor containers are inserted into the container table in the data base in which the artifact data resides and the mapping between this database and the artifact type neutral container is stored in the element site table. A background process may periodically delete redundant entries in the element site table in the artifact type neutral container database and in the container table in this database. When a listing of the artifacts in an artifact type neutral container in a multi-database environment is requested, the element site table is queried to locate the databases that contain artifacts for the artifact type neutral container. Then the algorithm described above is performed in each of the returned databases.

Figure 2:
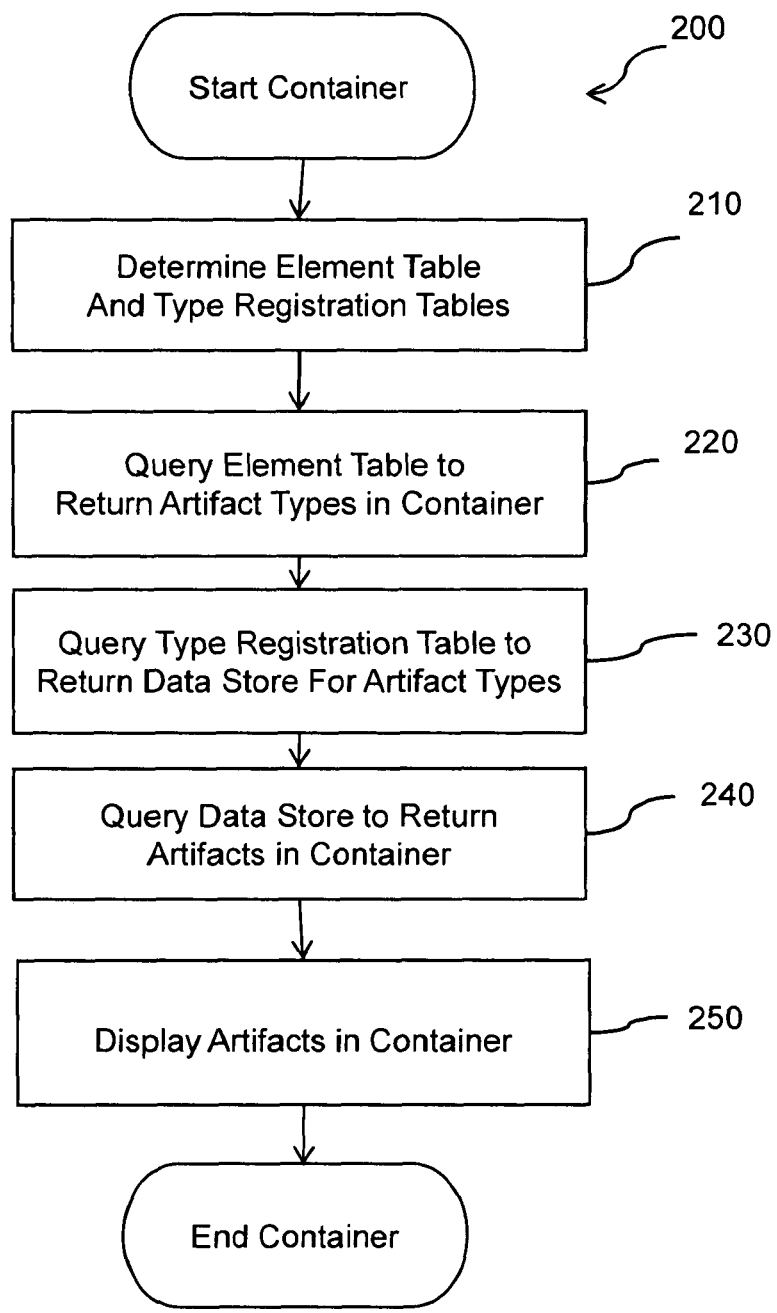
FIG. 2 illustrates an example embodiment of a method associated with an artifact type neutral container.

FIG. 2 illustrates an example embodiment of a computer-implemented method 200 that aggregates artifacts having more than one artifact type in an artifact type neutral container. At 210 artifacts are aggregated by determining an element table that maps a container identifier to an artifact type identifier for each type of artifact aggregated within the artifact type neutral container. A type registration table is also determined that maps artifact type identifiers to a data store identifier that identifies the data store that stores artifacts of the artifact type. At 220 the element table is queried to return the artifact type identifiers that identify the artifact types aggregated within the artifact type neutral container. At 230 the type registration table is queried for each identified artifact type to return a data store identifier that identifies an artifact data store that stores artifacts of the artifact type. At 240 each identified data store is queried to return artifact identifiers that identify artifacts aggregated within the artifact type neutral container. At 250 the artifacts aggregated within the artifact type neutral container are displayed.

Figure 3:
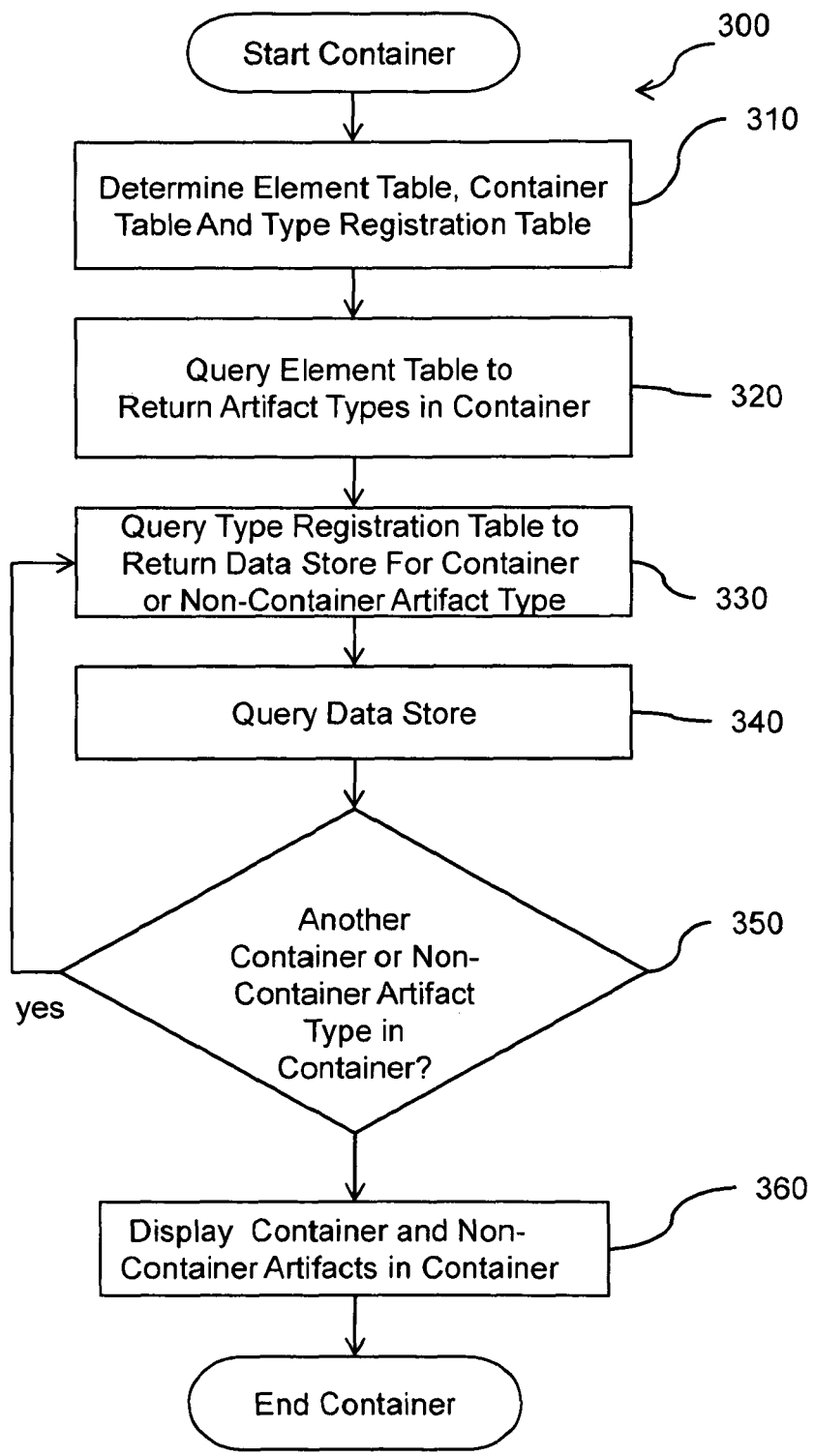
FIG. 3 illustrates another example embodiment of a method associated with an artifact type neutral container.

FIG. 3 illustrates an example embodiment of a computer-implemented method 300 that aggregates artifacts in an artifact type neutral container that is part of a hierarchical arrangement of artifact type neutral containers. At 310 an element table, container table, and type registration table are determined. The container table maps a child container that identifies a child container to one or more parent container identifiers that identify one or more parent containers in which the child container is aggregated. At 320 the element table is queried to return artifact types stored in the artifact type neutral container. At 330, the type registration table is queried to return the data store for the next container or non-container artifact type in the artifact type neutral container. At 340 the identified data store is queried to return container or non-container artifacts of that type. If at 350 it is determined that there are more container or non-container artifact types left in the artifact type neutral container, the method loops back to 330-350 to process each container and non-container artifact type. In this manner, the method loops from 330 to 350 until all container and non-container artifact types aggregated within the artifact type neutral container are identified. At 350 if there are no more container or non-container artifact types left in the artifact type neutral container, at 360 the container and non-container artifacts aggregated in the artifact type neutral container are displayed.

While FIGS. 2 and 3 illustrate various actions occurring in serial, it is to be appreciated that various actions illustrated in FIG. 2 could occur substantially in parallel. By way of illustration, a first process could construct the element and type registration tables, a second process could query the element and type registration tables and the data store, and a third process could return artifacts in the artifact type neutral container. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes maintaining type registration and access tables and querying those tables to return artifacts aggregated within an artifact type neutral container. While executable instructions associated with the above method are described as being stored on a computer-readable medium, it is to be appreciated that executable instructions associated with other example methods described herein may also be stored on a computer-readable medium.

In one example, data structures may be constructed that facilitate storing data on a computer-readable medium and/or in a data store. Thus, in one example, a computer-readable medium may store a data structure that includes a first field for data associated with an artifact identifier, a second field for data associated with a type for the artifact, and a third field for data associated with an artifact type neutral container that contains the artifact type. With this "raw" data available, the data structure may also include a fourth field for storing a listing of artifacts that are aggregated within a given artifact type neutral container that is derived from data located in one or more of the first through third fields. While four fields are described, it is to be appreciated that a greater and/or lesser number of fields could be employed.

FIG. 4 illustrates an example embodiment of two data stores, an element table, a type registration table, and a container table that will be referred to in the following examples.

Example 1

Artifact Creation

To create a new file type artifact in artifact type neutral container identified as U1, a unique identifier (e.g., F03) is generated for the file type artifact. The element table is queried to determine if the artifact type "file" is already recorded for U1. If the artifact type "file" is not yet recorded for the artifact type neutral container U1, a row is added to the element table that lists the container identifier U1 and the artifact type "file".

Example 2

Artifact Deletion

To delete a file type artifact F01 from the data store file table, the row in the data store table for the artifact is deleted. Then the row in the element table that maps U3 to a file type artifact is deleted. Due to the referential integrity constraint between the container identifier and the artifact type identifier columns of the data store and the container identifier and element type identifiers of the element table, if there is another artifact of this type in the data store for artifact type neutral container U3, the row in the element table could not be deleted.

Example 3

Artifact Listing

To obtain a listing of all artifacts stored within artifact type neutral container U1, the element table is queried to return the artifact types aggregated within U1. This query returns mail, file, and artifact type neutral container types. For each non-container artifact type, the type registration table is queried to identify the data store that stores artifacts of this type. The file table and mail table are identified and these two tables are queried for any artifact identifiers that have a container identifier of U1 (e.g., F03, M02). Because the element table also lists a container type artifact as being contained by U1, the container table is queried to return the child containers of U1, which in this case are U2 and U3.

Figure 5:
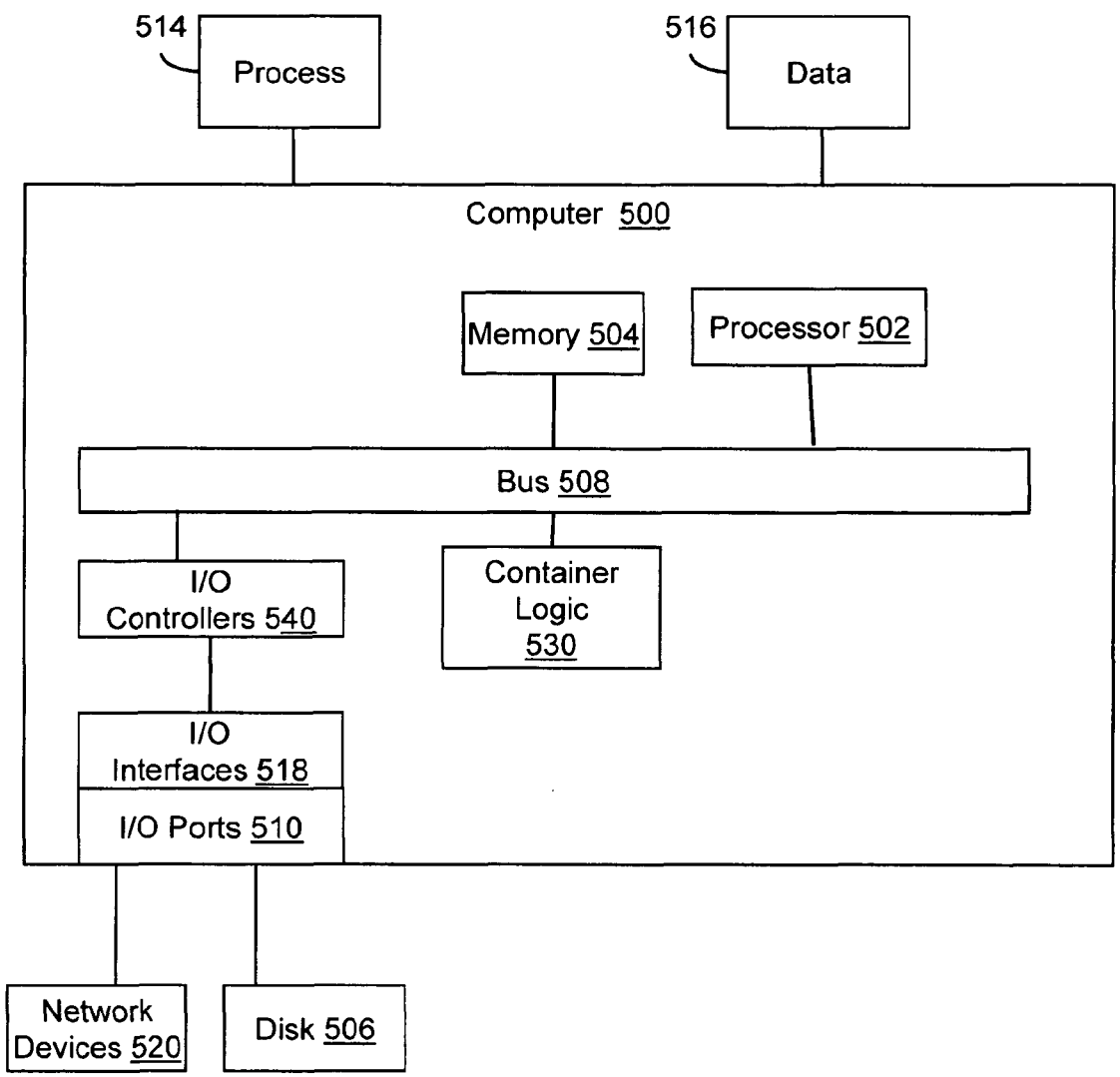
FIG. 5 illustrates an example computing environment in which example systems and methods, and equivalents, may operate.

FIG. 5 illustrates an example computing device in which example systems and methods described herein, and equivalents, may operate. The following acronyms are used with reference to FIG. 10 and are defined as follows:

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.

XML: extensible markup language.

WAN: wide area network.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include an artifact type neutral container logic 530 configured to facilitate implementation of an artifact type neutral container. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software, firmware) for an artifact type neutral container.

The means may be implemented, for example, as an ASIC programmed to implement an artifact type neutral container. The means may also be implemented as computer executable instructions that are presented to computer 500 as data 516 that are temporarily stored in memory 504 and then executed by processor 502.

Logic 530 may also provide means (e.g., hardware, software, firmware) for implementing an artifact type neutral container.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A computer-implemented method comprising:
    aggregating a plurality of artifacts having different artifact types in an artifact type neutral container by:
        storing, in an element table, a container identifier for the artifact type neutral container mapped to an artifact type identifier for each type of artifact aggregated within the artifact type neutral container, where an artifact type identifier of a given artifact identifies an application that generated the given artifact;
        storing, in a type registration table respective artifact type identifiers mapped to respective data store identifiers, such that each artifact type is mapped to a data store that stores artifacts of the artifact type; and
        where the data store records, for each stored artifact, an artifact identifier, an artifact type identifier, and a container identifier that identifies an artifact type neutral container in which the artifact is aggregated;
    querying the element table to return the artifact type identifiers that identify the artifact types aggregated within the artifact type neutral container;
    querying the type registration table for each identified artifact type to return a data store identifier that identifies an artifact data store that stores artifacts of the artifact type;
    querying each identified data store to return artifact identifiers that identify artifacts aggregated within the artifact type neutral; and
    returning artifact identifiers for the artifacts aggregated within the artifact type neutral container.

2. The computer-implemented method of claim 1 comprising determining a container table that maps a child container identifier that identifies a child container to one or more parent container identifiers that identify one or more parent containers in which the child container is aggregated.

3. The computer-implemented method of claim 2 comprising querying the container table to return a child container identifier that is mapped to the artifact type neutral container such that the artifact type neutral container is a parent container to the child container.

4. The computer-implemented method of claim 3 comprising, for each child container identifier that is mapped to the artifact type neutral container:
    querying the element table to return the artifact type identifiers that identify the artifact types aggregated within the child container;

querying the type registration table for each identified artifact type to return a data store identifier that identifies an artifact data store that stores artifacts of the artifact type; and querying each identified data store to return artifact identifiers that identify artifacts aggregated within the child container.

5. The computer-implemented method of claim 1 where the storing of artifact information is performed by storing artifact information in two or more data stores located in two or more databases and where the determining of the element table is performed by storing an element table in each database of the two or more databases, the element table in each database recording artifact type identifiers for artifacts stored in the database, the method further comprising:

determining an element site table that maps a container identifier that identifies an artifact type neutral container to one or more database identifiers that identify databases in which an element table that stores information about artifacts aggregated in the artifact type neutral container is located; and querying the element site table to return one or more database identifiers that identify one or more databases in which an element table that stores information about artifacts aggregated in the artifact type neutral container is located.

6. The computer-implemented method of claim 1 comprising imposing a referential integrity constraint between the container identifier and artifact type identifier in the data store and the container identifier and artifact type identifier in the element table, where the element table is designated as a parent for the purposes of the constraint and the data store is designated as a child for the purposes of the constraint.

7. The computer-implemented method of claim 2 comprising imposing a referential integrity constraint between the container identifier in the element table and the container identifier in the container table where the container table is designated as a parent for the purposes of the constraint and the element table is designated as a child for the purposes of the constraint.

8. The computer-implemented method of claim 1 where the querying is performed by generating a dynamic PL/SQL code query.

9. A computing system comprising:

an artifact type neutral container stored in a non-transitory computer-readable medium, the artifact type neutral container comprising:

an element table determination logic configured to store, in an element table, a container identifier for the artifact type neutral container mapped to an artifact type identifier for each type of artifact aggregated within the artifact type neutral container;

a type registration table determination logic configured to store, in maintain a type registration table, that maps respective artifact type identifiers mapped to respective data store identifiers, such that each artifact type is mapped to a data store that stores artifacts of the artifact type;

where the data store records, for each stored artifact, an artifact identifier, an artifact type identifier, and a container identifier that identifies an artifact type neutral container in which the artifact is aggregated;

a query engine configured to:

query the element table to return one or more artifact type identifiers that identify an artifact type for each type of artifact aggregated within the artifact type neutral container; query the type registration table to return one or more data store identifiers that identify one or more data stores that store artifacts of the returned artifact types;

query the one or more data stores identified by the one or more data store identifiers to return artifact identifiers for artifacts aggregated within the artifact type neutral container; and a display to display the returned artifact identifiers aggregated within the type neutral container.

10. The computing system of claim 9 comprising a container table determination logic configured to maintain a container table that maps a child container identifier that identifies a child container to one or more parent container identifiers that identify one or more parent containers in which the child container is aggregated and where the query engine is provided to query the container table to return a child container identifier that is mapped to the artifact type neutral container such that the artifact type neutral container is a parent container to the child container.

11. The computing system of claim 9 where artifacts are stored in two or more data stores located in two or more databases, the computing system comprising:

an element table stored in each database of the two or more databases, the element table in each database recording artifact type identifiers for artifacts stored in the database;

an element site table that maps a container identifier that identifies an artifact type neutral container to one or more database identifiers that identify databases in which an element table that stores information about artifacts aggregated in the artifact type neutral container is located; and where the query engine is provided to generate and execute queries on the element site table to return one or more database identifiers that identify one or more databases in which an element table that stores information about artifacts aggregated in the artifact type neutral container is located.

12. An artifact type neutral container that aggregates artifacts having more than one artifact type comprising:

an element table stored in a non-transitory computer-readable medium that maps a container identifier to an artifact type identifier for each type of artifact aggregated within the artifact type neutral container, where an artifact type identifier of a given artifact identifies an application that is used to modify the given artifact;

a type registration table stored in a non-transitory computer-readable medium that maps artifact type identifiers to data store identifiers that identify data stores that store artifacts of each artifact type;

where the data store records, for each stored artifact, an artifact identifier, an artifact type identifier, and a container identifier that identifies an artifact type neutral container in which the artifact is aggregated;

a query engine, embodied as computer-executable instructions stored on a non-transitory computer-readable media, that when executed by a computer cause the computer to:

query the element table to return the artifact type identifiers that identify the artifact types aggregated within the artifact type neutral container;

query the type registration table for each identified artifact type to return a data store identifier that identifies an artifact data store that stores artifacts of the artifact type; and query each identified data store to return artifact identifiers that identify artifacts aggregated within the artifact type neutral container.

13. The artifact type neutral container of claim 12 further comprising a container table that maps a child container identifier that identifies a child container to one or more parent container identifiers that identify one or more parent containers in which the child container is aggregated and where the query engine is provided to query the container table to return a child container identifier that is mapped to the artifact type neutral container such that the artifact type neutral container is a parent container to the child container.

14. The artifact type neutral container of claim 13 where the artifact data store is located in a first database separate from a second database in which the container table is stored, the artifact data store storing artifacts that are aggregated in the artifact type neutral container;

an element table stored in the first database, the element table recording artifact type identifiers for artifacts stored in the first database;

an element site table stored in the second database that maps a container identifier that identifies an artifact type neutral container to a database identifier that identifies the first database in which the element table that stores information about artifacts aggregated in the artifact type neutral container is located; and where the query engine is provided to generate and execute queries on the element site table to return a database identifier that identifies the first database in which the element table that stores information about artifacts aggregated in the artifact type neutral container is located.

15. A non-transitory computer-readable medium storing computer-executable instructions that when executed by a computer cause the computer to perform a method, the method comprising:

receiving a container identifier;

querying an element table to return one or more artifact types aggregated within an artifact type neutral container identified by the container identifier, where an artifact type identifier of a given artifact identifies an application that generated the given artifact;

querying a type registration table to return one or more data stores that store artifacts of the returned one or more artifact types;

querying the returned one or more identified data stores to return artifact identifiers for artifacts aggregated within the artifact type neutral container identified by the container identifier; and displaying the returned artifact identifiers for artifacts aggregated within the artifact type neutral container.

16. The computer-readable medium of claim 15 where the computer-executable instructions include querying a container table to return a child container identifier that is mapped to the artifact type neutral container such that the artifact type neutral container is a parent container to the child container and further where the computer-executable instructions are repeated for each returned child container.

17. A non-transitory computer-readable medium storing computer-executable instructions that when executed by a computer cause the computer to perform a method, the method comprising:

receiving an artifact having an artifact type, where an artifact type identifier of a given artifact identifies an application that controls a lifecycle of a given artifact;

storing the artifact in a data store by recording an artifact identifier that identifies the artifact, an artifact type identifier that identifies the artifact type, and a container identifier that identifies an artifact type neutral container in which the artifact is aggregated;

recording a data store identifier that identifies the data store in which the artifact is stored and the artifact type identifier in a type registration table;

recording the artifact type and the container identifier in an element table; and providing a query engine to query the data store, the type registration table, and the element table to return artifact identifiers for artifacts aggregated in the artifact type neutral container.

* * * * *

UNITED STATES PATENT AND TRADEMARK OFFICE
CERTIFICATE OF CORRECTION

PATENT NO.       : 8,886,688 B2                                          Page 1 of 1
APPLICATION NO.  : 12/317729
DATED            : November 11, 2014
INVENTOR(S)      : Chatterjee et al.

It is certified that error appears in the above-identified patent and that said Letters Patent is hereby corrected as shown below:

On title page, column 2, References Cited under Other Publications, line 1, delete "Nguen" and insert -- Nguyen --, therefor.

On title page, column 2, References Cited under Other Publications, line 5, delete "Nguen," and insert -- Nguyen, --, therefor.

In the Claims

In column 11, line 54, in Claim 9, after "in" delete "maintain".

In column 11, line 54, in Claim 9, after "table," delete "that maps".

Signed and Sealed this
Twenty-third Day of June, 2015

Michelle K. Lee
*Director of the United States Patent and Trademark Office*